July 28, 1925.
C. BERLING
SHOOTING SPECTACLES
Filed Nov. 8, 1923
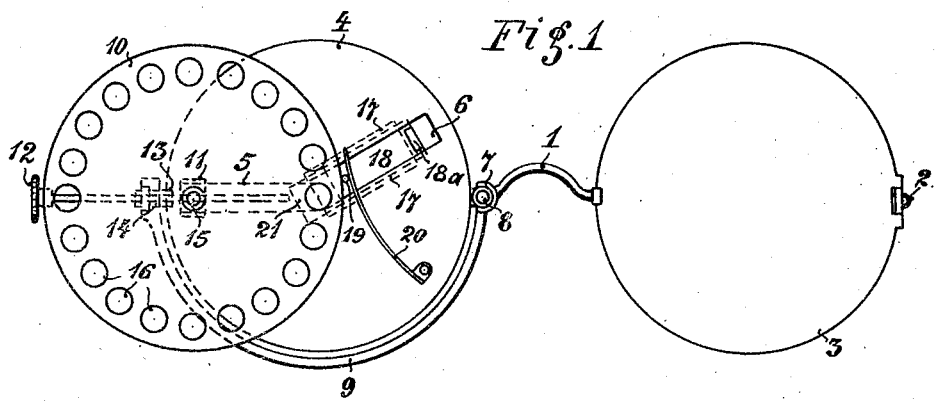
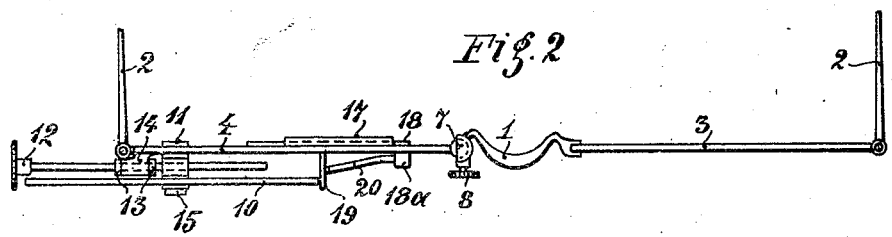
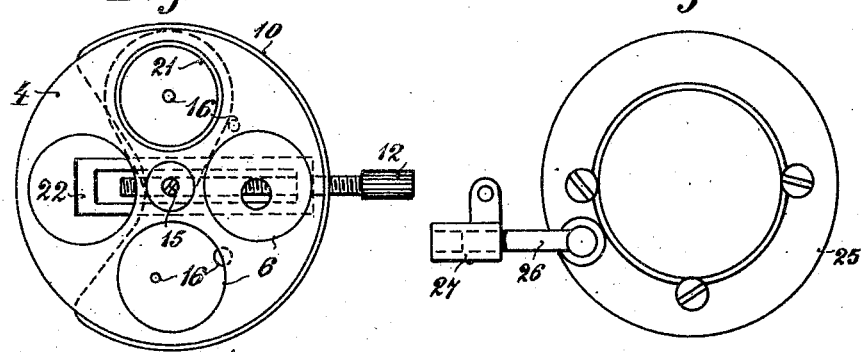
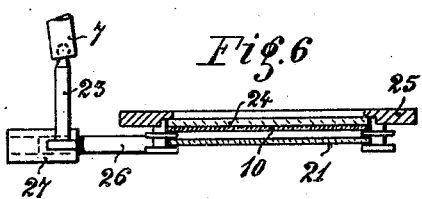
Inventor:-
Carl Berling
by
Attorney Patented July 28, 1925.

1,547,406

UNITED STATES PATENT OFFICE.

CARL BERLING, OF ZURICH, SWITZERLAND.

SHOOTING SPECTACLES.

Application filed November 8, 1923. Serial No. 673,415.

*To all whom it may concern:*

Be it known that I, CARL BERLING, a citizen of the Swiss Confederation, residing at Zurich, Switzerland, have invented certain new and useful Improvements in Shooting Spectacles, for which I have filed applications for patent in Switzerland on the 27th December, 1922, and 14th September, 1923, and of which the following is a specification.

Shooting spectacles are known which have a diaphragm, having several openings, rotatably and movably arranged in front of the covering plate of the aiming eye. Shooting spectacles of this type have the inconvenience that the aiming axis is not straight at any position of the person who shoots as the diaphragm is fixed centrally on the cover plate and the aperture for viewing the openings in the diaphragm is eccentrically arranged in the cover plate. When shooting standing or kneeling distortions of the image are thus produced which interfere with the sure aiming. This invention has for its object to avoid the inconveniences which result from this defect of the shooting spectacles.

Three forms of construction of shooting spectacles are shown by way of example on the accompanying drawing.

Figs. 1, 3 and 5 show each one form of construction in front elevation, and

Figs. 2, 4 and 6 are the corresponding top plan views.

In the form of construction shown in Figs. 1 and 2 an opaque plate 3, for instance in the shape of a glass of spectacles is fixed at the right hand end of the nose bow 1 to cover the eye which is not used at the aiming. At the left hand end of the bow 1 the opaque cover plate 4 for the aiming eye is attached by means of a ball joint 7, adapted to be fixed by a screw 8, and of a semi-circular bow 9 serving as holder, so that this opaque cover plate 4 is adjustable in any direction.

On the opaque plate 3 and on the outer end of the holder 9 the commonly used ear hooks 2 are fixed. The coverplate 4 for the aiming eye has a slit-like aperture 5, 6 extending almost over the entire diameter of the plate. This slit is horizontal from the outer end to about the centre of the plate and upwardly inclined from the centre to its inner end. The angle of inclination is preferably 30°. In the slit 5, 6 a slidable body 11 is movably mounted on which by means of an axle 15 the diaphragm 10 of convenient material, for instance metal, is rotatably mounted. A screw spindle 12 screwed into a threaded boring of axle 11 and mounted in an eye 14 of the frame serves for displacing the diaphragm in the slit. Two collars 13 of the screw spindle are in contact with the end walls of the eye 14. A convenient number of openings 16 are arranged in the diaphragm 10, preferably concentrical to the centre of the diaphragm. These openings 16 may be of different sizes and convenient lenses may be set in the same. When the diaphragm 10 is in the initial position the circle of openings 16 traverses exactly the centre of the cover plate 4.

A slide 18 in the part 6 of the slit serves for closing this part 6 through which, at a corresponding adjusting of the diaphragm 10, disturbing side-light could fall in. The slide 18 moves in guides 17 and a stud 19 fixed on this slide is pressed by the action of a spring 20 against the rim of the diaphragm 10 so that this diaphragm draws the slide along when it is being adjusted in inward direction. On the inner end of slide 18 a light filter known per se for shooting spectacles, for instance a yellow pane 21 or an iris diaphragm or the like is fixed. A projection 18$^a$ at the outer end of the slide is used when the light filter is not to be used at the shooting. In this case the slide 18 is removed and reversed so that the light filter 21 is on the rear side and the projection 18$^a$ is substituted for the stub 19.

When the spectacles are to be used, the plate 4 is adjusted by means of the ball joint 7 in accordance with the position in which the person has to be at the shooting and secured in the adjusted position by the screw 8, so that it cannot move accidentally. By rotating the diaphragm 10 the desired opening 16 is brought into register with slot 5, 6. As this slot extends over the centre of the cover plate as well as over part of the inner upper quadrant of said plate a straight aiming axis can be obtained for any shooting position whereby the correct and accurate aiming is ensured.

The forms of construction shown in Figs. 3–6 are simpler, lighter and cheaper than the form of construction which has been above described and they permit the instantaneous adjusting for shooting with a rifle and with a pistol.

In the form of construction shown in Figs. 3 and 4 the cover plate 4 is mounted centrally with the diaphragm 10 which has an aperture and several openings 10 of different sizes. These openings can be adjusted centrally to the opening 6 of the disk 4 by rotation of the diaphragm; a rotatable yellow disk 21 is further arranged as light filter centrally to the two disks 4, 10. The axle 15 common for all disks is adjustable in a slit guide 22, in known manner, by means of a spindle 12 with handle, the female thread for the screw spindle being in the axle 15. A stud 23 fixed in the slit guide 22 forms together with sleeve 7 the ball joint by which all the parts are adjustably fixed on the spectacle frame.

When the spectacles are to be used for shooting the diaphragm 10 is adjusted half to the left for rifle shooting and half to the right for pistol shooting.

The form of construction shown in Figs. 5 and 6 is especially designed for astigmatics for whom the spheric cylindrical lens must be adjusted horizontally and vertically upon each optical axis position. With this object in view the lens 24 is removably set in a mounting 25 in which the yellow disk 21 and the diaphragm 10 with its different openings 16 are also removably mounted. The mounting with the disks is rotatable on a stud 26 which is horizontally adjustable in a clamping sleeve 27. On this clamping sleeve 27 a stud 23 is mounted which forms together with sleeve 7 a ball joint on the spectacle frame. As the visual power of astigmatics decreases from year to year the lens 24 can be exchanged in accordance with the sight.

I claim:—

1. Shooting spectacles comprising in combination a cover plate for the aiming eye having a slot extending over almost the entire diameter of the plate and being upwardly inclined at the inner end, a diaphragm on said cover plate having openings of different size adapted to be brought into register with a part of said slot corresponding to the desired shooting position and to adjust the accurate aiming line, and means for securing the diaphragm in the adjusted position.

2. Shooting spectacles comprising in combination a cover plate for the aiming eye having a slot extending over almost the entire diameter of the plate and being upwardly inclined at the inner end, a diaphragm on said cover plate having openings of different size adapted to be brought into register with a part of said slot corresponding to the desired shooting position and to adjust the accurate aiming line, a slidable body in said slot, an axle on said slidable body on which the diaphragm is rotatably mounted, and a screw spindle for adjusting said slidable body and with it said diaphragm in said slot.

3. Shooting spectacles comprising in combination a cover plate for the aiming eye having a slot extending over almost the entire diameter of the plate and being upwardly inclined at the inner end, a diaphragm on said cover plate having openings of different size adapted to be brought into register with a part of said slot corresponding to the desired shooting position and to adjust the accurate aiming line, and means for securing the diaphragm in the adjusted position, a spring-controlled slide in the upwardly inclined part of said slot, and means for connecting said slide with said diaphragm so that it is automatically adjusted with said diaphragm to prevent the filtering in of undesirable secondary light through the inclined part of the slot.

4. Shooting spectacles comprising in combination a cover plate for the aiming eye having openings, a diaphragm on said cover plate having openings, a yellow filter associated with the openings of the cover plate and diaphragm, a spectacle frame having a guide slot, a sliding block in the frame slot for supporting the diaphragm, and a screw spindle mounted in said sliding block and in said spectacle frame.

In testimony whereof I affix my signature in presence of two witnesses.

CARL BERLING.

Witnesses:
  A. F. CALIOEN,
  OUGUST RISEGG.